US010004358B2

(12) United States Patent
Wildebush (10) Patent No.: US 10,004,358 B2
(45) Date of Patent: Jun. 26, 2018

(54) TOASTER WITH CONTROLLED CONVEYOR SPEED

(75) Inventor: Hans Anderson Wildebush, Milwaukee, WI (US)

(73) Assignee: HATCO CORPORATION, Milwaukee, WI (US)

( * ) Notice: Subject to any disclaimer, the term of this patent is extended or adjusted under 35 U.S.C. 154(b) by 120 days.

(21) Appl. No.: 13/473,285

(22) Filed: May 16, 2012

(65) Prior Publication Data

US 2013/0306616 A1   Nov. 21, 2013

(51) Int. Cl.
| | | |
|---|---|---|
| F27B 9/40 | (2006.01) |
| A21B 1/40 | (2006.01) |
| A21B 1/48 | (2006.01) |
| A47J 37/08 | (2006.01) |
| A47J 37/04 | (2006.01) |
| A47J 37/06 | (2006.01) |

(52) U.S. Cl.
CPC ......... *A47J 37/0857* (2013.01); *A47J 37/044* (2013.01); *A47J 37/0623* (2013.01); *F27B 9/40* (2013.01); *A21B 1/48* (2013.01)

(58) Field of Classification Search
CPC ..... A21B 1/40; A21B 1/48; F24C 7/04; F27B 9/062–9/066; F27B 9/24; F27B 9/243; F27B 9/40; F27B 2009/24; F27B 2009/243; F27D 19/00; F27D 2003/0063; F27D 2019/0003; F27D 2019/0059; F27D 2021/02; F27D 2021/026; A47J 37/045; A47J 37/0814; A47J 37/0835; A47J 37/085
See application file for complete search history.

(56) References Cited

U.S. PATENT DOCUMENTS 4,246,834 A * 1/1981 Brown ........................... 99/334
4,554,437 A   11/1985 Wagner et al.
(Continued)

FOREIGN PATENT DOCUMENTS

WO    2007050136    5/2007

OTHER PUBLICATIONS

International Search Report and Written Opinion for Application No. PCT/US2013/036415 dated Aug. 1, 2013 (10 pages).
(Continued)

*Primary Examiner* — Joseph M Pelham
(74) *Attorney, Agent, or Firm* — Michael Best & Friedrich LLP (57) ABSTRACT

A conveyor oven comprising a housing defining a cook chamber and a heating element adjacent the cook chamber. A controller is programmed to control a cook time based upon a current estimated temperature in the oven, wherein the current estimated temperature is a function of a heat power input during a previous time period and can also be a function of a previous estimated temperature. The oven can further include a conveyor and a motor coupled to the conveyor, wherein the controller is programmed to control a cook time of the conveyor. The controller can also be programmed to control the cook time based upon a product loading condition. The oven can further include a presence sensor for detecting the presence of food in the oven and for providing a corresponding signal. Preferably, the calculation is an eye calculation that is a function of a previous eye calculation.

11 Claims, 5 Drawing Sheets

(56) References Cited

U.S. PATENT DOCUMENTS

| | | | |
|---|---|---|---|
| 4,883,944 A * | 11/1989 | Takano | A21B 1/40 |
| | | | 219/492 |
| 5,179,265 A * | 1/1993 | Sheridan et al. | 219/497 |
| 5,253,564 A * | 10/1993 | Rosenbrock et al. | 99/328 |
| 5,821,503 A * | 10/1998 | Witt | 219/388 |
| 6,006,656 A | 12/1999 | Lulofs et al. | |
| 6,157,002 A * | 12/2000 | Schjerven et al. | 219/388 |
| 6,168,064 B1 | 1/2001 | Berkin | |
| 6,198,078 B1 | 3/2001 | Wanat et al. | |
| 6,543,337 B1 | 4/2003 | Brown | |
| 6,624,396 B2 * | 9/2003 | Witt et al. | 219/497 |
| 7,038,172 B1 * | 5/2006 | Stuck | 219/388 |
| 7,541,559 B2 * | 6/2009 | Milz | 219/388 |
| 7,592,570 B2 | 9/2009 | Yoder et al. | |
| 8,188,408 B2 * | 5/2012 | Claesson et al. | 219/388 |
| 8,929,724 B1 * | 1/2015 | Mograbi | A21B 2/00 |
| | | | 219/405 |
| 2003/0042248 A1 | 3/2003 | Witt et al. | |
| 2003/0233173 A1 | 12/2003 | Stewart | |
| 2004/0016744 A1 | 1/2004 | Ottaway | |
| 2004/0262300 A1 * | 12/2004 | Yu et al. | 219/685 |
| 2007/0012307 A1 * | 1/2007 | Wiker | A21B 1/40 |
| | | | 126/21 A |
| 2008/0057170 A1 | 3/2008 | Chen et al. | |
| 2008/0203085 A1 | 8/2008 | Hensel | |
| 2008/0230533 A1 * | 9/2008 | Claesson et al. | 219/388 |
| 2009/0075224 A1 | 3/2009 | Wiker et al. | |
| 2011/0269085 A1 * | 11/2011 | Wiker | A21B 1/40 |
| | | | 432/4 |
| 2011/0277643 A1 | 11/2011 | Schwierking et al. | |
| 2017/0215434 A1 * | 8/2017 | Wiker | A21B 1/40 |

OTHER PUBLICATIONS

PCT/US2013/36415 International Preliminary Report on Patentability dated Apr. 3, 2014 (9 pages).
Notification and English translation of First Office Action from the Intellectual Property Office of the People's Republic of China for Application No. 201380035467.3 dated Sep. 2, 2015 (16 pages).
Extended European Search Report for Application No. 13790524.6 dated Mar. 21, 2016 (8 pages).
Chinese Patent Office Action for Application No. 201380035467.3 with English Translation dated Apr. 29, 2016 (14 pages).

* cited by examiner

TOASTER WITH CONTROLLED CONVEYOR SPEED

BACKGROUND

The present invention relates to the field of conveyor toasters, and specifically to mechanisms for controlling the degree of cooking of the food product.

Conveyor toasters typically include a housing having a cook chamber, a conveyor for moving food product through the cook chamber, and heating elements for cooking the food product as it is moved through the cook chamber. In order to control the level of cooking of the food product, it is known to control the speed of the conveyor. For example, U.S. Pat. No. 6,624,396, assigned to Hatco Corporation discloses a conveyor oven that controls the speed of the conveyor based on the temperature inside the oven. For example, if the temperature in the oven is relatively low, then the conveyor will slow down to allow the food product to cook to the desired level. In addition, U.S. Pat. No. 5,253,564 discloses a conveyor oven that has pre-programmed cook options with different conveyor speeds and heat percentage for different types of food products.

In order to conserve energy, conveyor toasters often include a standby mode that stops the conveyor and reduces the heat percentage supplied to the heating elements. The standby mode can be entered by pressing an appropriate button (e.g., a "standby" button), or it can be entered automatically upon the detection of no food product on the conveyor for a period of time. The standby mode can be exited by pressing an appropriate button (e.g., a "cook" button), or it can be exited automatically upon the detection of food product on the conveyor.

SUMMARY

The present invention provides a conveyor oven comprising a housing defining a cook chamber and a heating element positioned adjacent the cook chamber. A controller is programmed to control a cook time based upon a current estimated temperature in the oven, wherein the current estimated temperature is a function of a heat power input during a previous time period. Preferably, the oven further includes a conveyor positioned to move food product through the cook chamber, and a motor coupled to the conveyor, wherein the controller is programmed to control a speed of the conveyor. In one embodiment, the current estimated temperature is a function of a previous estimated temperature. An element time constant can be used to account for different ovens.

In another aspect of the invention, the controller is programmed to control a cook time based upon a product load calculation, wherein the product load calculation is a function of a presence of food in the oven. In one embodiment, the oven further includes a presence sensor for detecting the presence of food in the oven and providing a corresponding signal to the controller. Preferably, the product load calculation is a function of a previous product load calculation, with or without a corresponding time constant.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
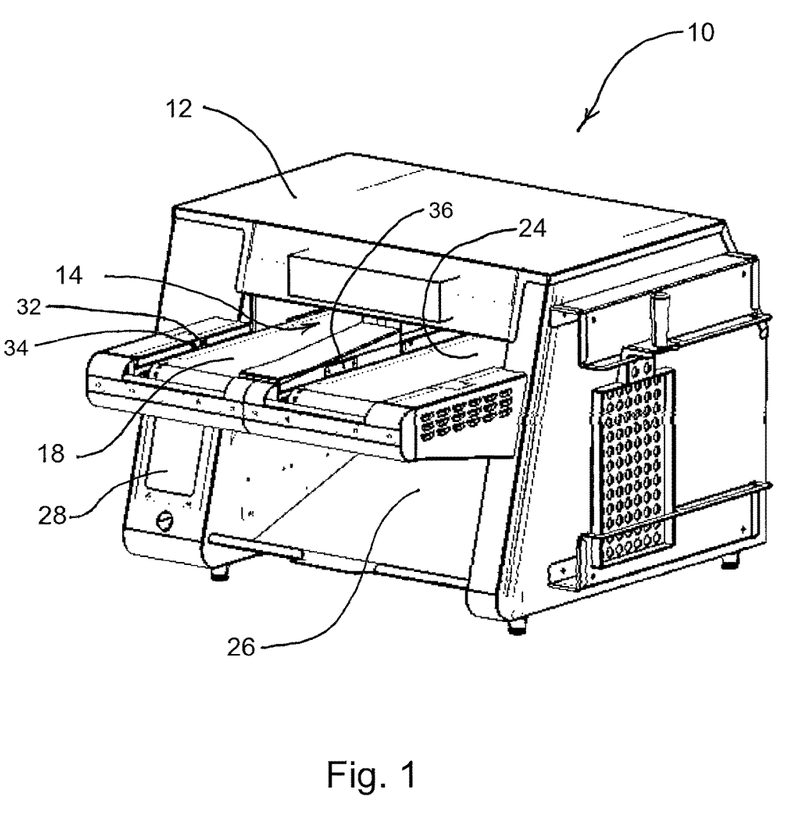
FIG. 1 is a perspective view of an oven embodying the present invention.
Figure 2:
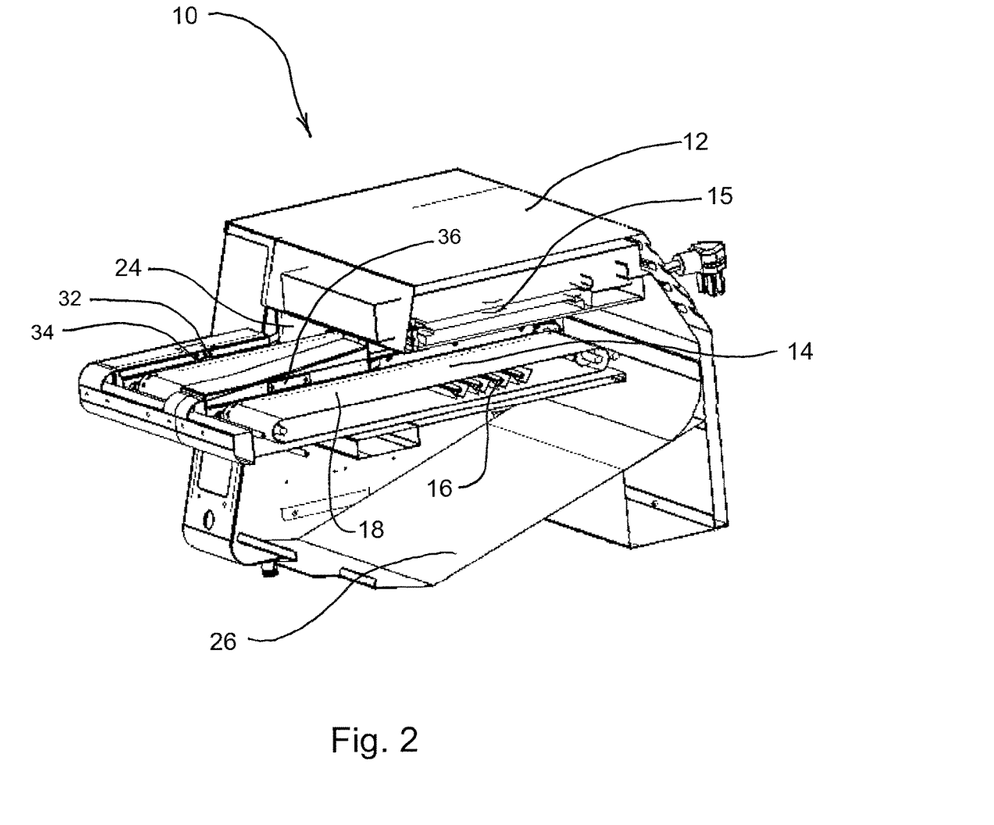
FIG. 2 is a section view taken along line 2-2 in FIG. 1.
Figure 3:
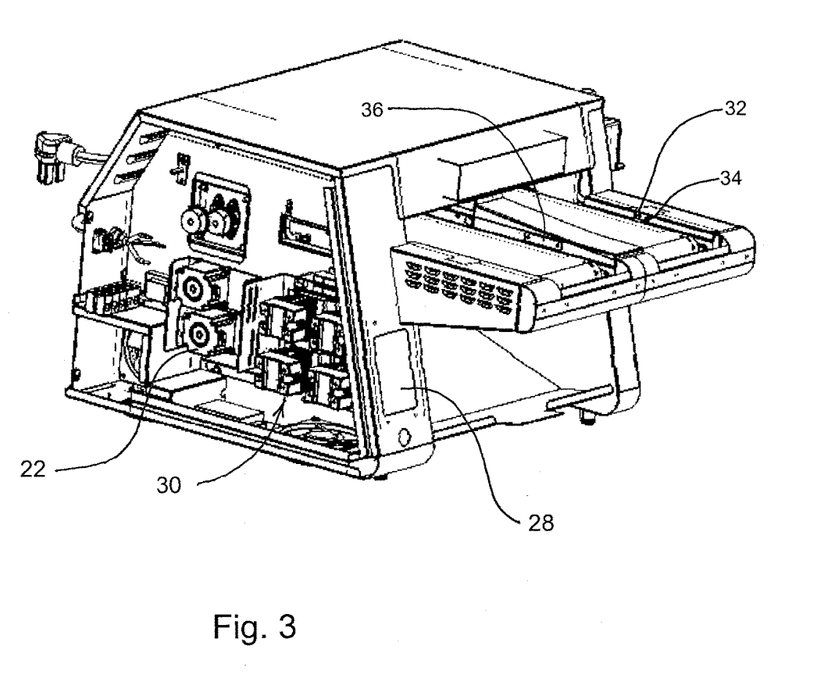
FIG. 3 is a section view taken along line 3-3 in FIG. 1.

FIG. 1 illustrates a conveyor toaster 10 that embodies the present invention. The toaster includes a housing 12 defining a cook chamber 14, top and bottom heating elements 15,16 positioned adjacent the cook chamber 14, and a conveyor 18 positioned to move food product through the cook chamber 14. A motor 22 is coupled to the conveyor 18 to provide movement to the conveyor 18. The cook chamber 14 has an entrance 24 through which a food product enters the toaster 10 and an exit 26 through which the food product exits the toaster 10 after the food product is cooked. A user input 28 can be used to input information into the toaster 10. A controller 30 is programmed to control the heating element 15,16 and a speed of the conveyor 18 based upon the user input and a variety of parameters and conditions.

The controller is programmed to operate the toaster in one of several different modes corresponding with different food types (e.g., bread, bagels, frozen waffles, etc.) that should be cooked at different heat settings and different cook times. The user can input the appropriate food type into the user input. Each food type will have a programmed desired heat setting HS and desired cook time CT that are pre-programmed based upon the steady-state characteristics of the toaster. Unless otherwise noted, the heat setting HS is presented as a dimensionless number from zero to 100. For example, a heat setting of 25 means that the corresponding heating element should be operating at 25% capacity at steady state, and a heat setting of 100 means that the heating element should be operating at its maximum or 100% capacity at steady state. The cook time CT is presented as the amount of time (e.g., in seconds) that a product takes to get through the toaster. For example, a cook time CT of 45 means that a product traveling on the belt has a throughput time of 45 seconds. For toasters with conveyors, the cook time will be inversely proportional to the conveyor speed. For toasters that do not have a conveyor, the cook time can be the amount of time for a cook cycle, which can be controlled by an alarm or by pushing the food out of the oven at the end of the cook time. For example, for a drawer-type oven, the drawer can pop open at the end of the cook time.

The controller drives the heating elements at a heat power input (e.g., the power provided to the heating elements), which can be represented by a heat percentage HP. The heat percentage HP is a dimensionless number from zero to 100 that represents the actual power level provided to the corresponding heating element. For example, an upper heat percentage HP of 65 means that the upper heating element is driven at 65% of its rated wattage. At steady state, the heat percentage HP of a heating element should approximately correspond with the heat setting HS for that heating element. However, when changing a heat setting, it is often desired to provide a heat percentage HP that is beyond (i.e., above when increasing the temperature and below when decreasing the temperature) the targeted heat setting in order to facilitate a faster change in the cooking ability of the oven. For example, when changing from a heat setting of 40 to a heat setting of 75, the controller can be programmed to drive the corresponding heating element at a heat percentage HP of 90 for a short period of time in order to bring the oven up to the desired cooking ability more quickly.

The heat percentage HP is calculated every second according to the following formula:

$$HP=(HS+(\text{proportional gain}*(HS-ET))$$

HS=heat setting
Proportional gain=2.0
ET=estimated temperature (defined below)

The proportional gain is a dimensionless multiplier that determines the rate at which the toaster will be heated or cooled when changing the heat settings. A larger proportional gain will heat and cool for rapidly, and a smaller gain will heat and cool more slowly. If the calculated heat percentage is greater than 100, then the actual heat percentage will be 100. Also, if the calculated heat percentage is less than zero, then the actual heat percentage will be 0.

The controller is also programmed to control the speed of the conveyor 18 based upon a predicted cooking ability or estimated temperature ET of the toaster 10. For example, if the estimated temperature ET is relatively low, the controller 30 will decrease the speed of the conveyor 18 so that the food product can cook properly. Similarly, if the estimated temperature ET is relatively high, the controller 30 will increase the speed of the conveyor 18 so that the food product does not over cook. The estimated temperature ET is a dimensionless number between zero and 100 and represents a calculated estimation of the ability of the toaster to cook food. An estimated temperature ET of zero corresponds with a toaster that is turned off long enough for the toaster to achieve a steady-state temperature. Similarly, an estimated temperature ET of 100 corresponds with a toaster when it has been running at a maximum heat setting long enough to achieve a steady-state temperature. The estimated temperature ET is calculated every second according to the following formula:

$$ET=(ET_{previous}*HTC)+(HP_{previous}*(1-HTC))$$

$ET_{previous}$=ET from the previous time period
HTC=heat time constant
$HP_{previous}$=HP from the previous time period The heat time constant HTC is a number from zero to one that represents the estimated rate at which a change in element wattage causes a change in toasting ability. The heat time constant HTC is derived empirically from element testing and is subject to change if there are changes to the element wattage, size, or other variable. In the illustrated embodiment, the HTC is 0.9952 for both the top and bottom elements when the temperature is rising and 0.9970 for both the top and bottom elements when the temperature is falling.

The estimated temperature ET is used to calculate a heat-based speed modifier $MOD_{heat}$ that will determine the desired speed of the conveyor. The heat-based speed modifier $MOD_{heat}$ is a dimensionless number from zero to 100 that represents the % of maximum conveyor speed. The heat-based speed modifier $MOD_{heat}$ is calculated every second according to the following formula:

$$MOD_{heat}=1+(\text{top gain}*(ET_{top}-HS_{top})/HS_{top})+(\text{bottom gain}*(ET_{bot}-HS_{bot})/HS_{bot})$$

top gain=1.08
$ET_{top}$=estimated temperature of the top element
$HS_{top}$=heat setting of the top element
bottom gain=1.08
$ET_{bot}$=estimated temperature of the bottom element
$HS_{bot}$=heat setting of the bottom element The top gain and bottom gain are used to describe a relationship between heat difference and necessary speed difference that is other than 1:1.

Using the above-calculated heat-based speed modification $MOD_{heat}$, the conveyor will be driven at a speed corresponding with an actual cook time $CT_{actual}$ that a modification of the setpoint cook time $CT_{setpoint}$ and is calculated according to the following formula:

$$CT_{actual}=MOD_{heat}*CT_{setpoint}*MOD_{other}$$

$MOD_{other}$=other modification

The toaster also includes a product sensor in the form of an electric eye (a transmitter 32, reflector 34, and receiver 36) that will sense when a product has been placed on the conveyor. The controller is programmed to enter a standby mode if it detects no activity (i.e., no products placed on the conveyor and no activity of the user input) for a period of time, such as fifteen minutes. When in the standby mode, the conveyor is stopped and the top and bottom heat settings are set at a user-programmable value, such as 25. In standby mode, once steady state operation has been achieved, the heat percentage HP of both the top and bottom heating elements is also 25, and the estimated temperature of the top and bottom elements is 25, according to the above-noted formulas.

Figure 4:
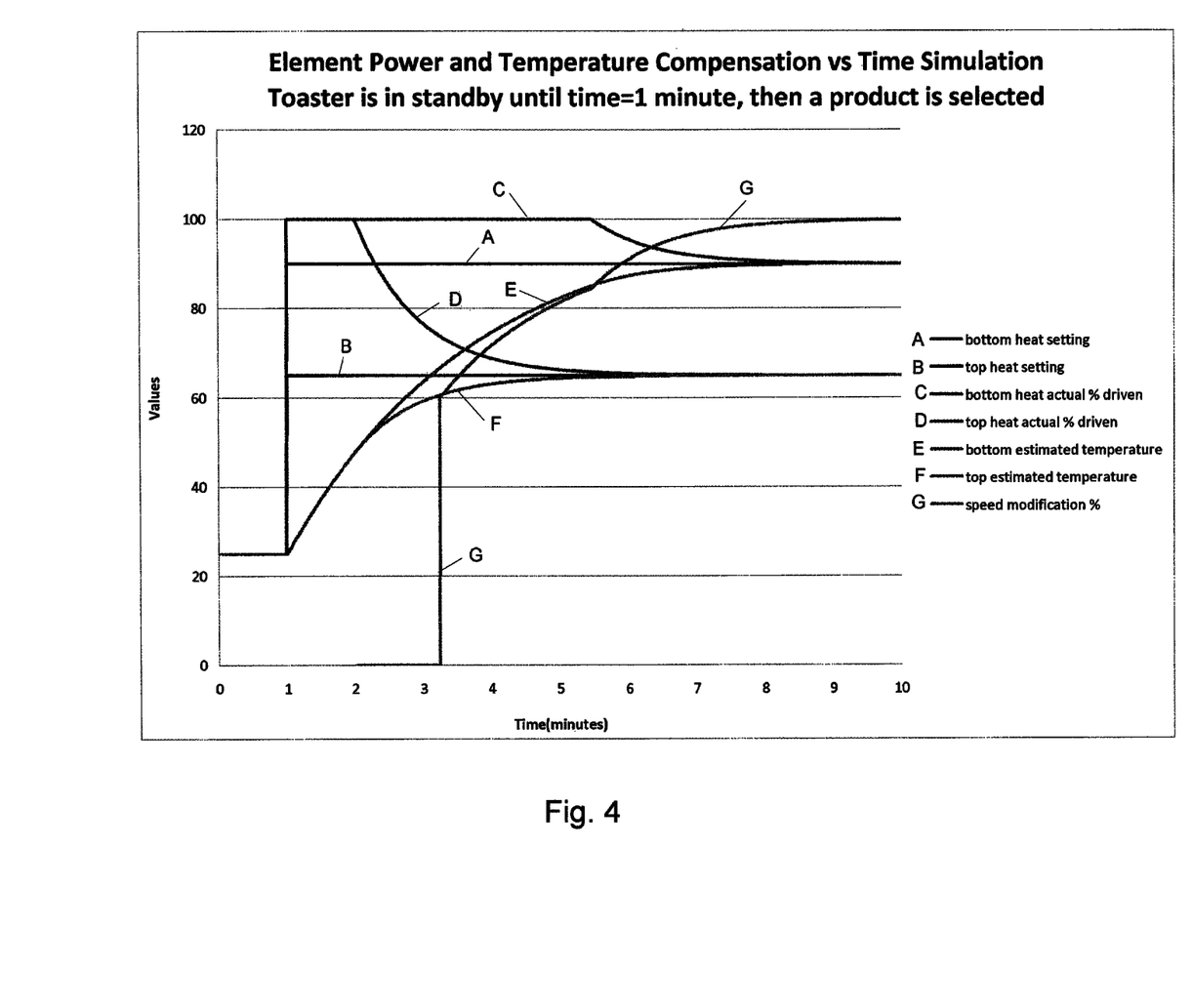
FIG. 4 is a chart showing heat-based speed modification.

The chart in FIG. 4 shows heat percentage HP, estimated temperature ET, and heat-based speed modification $MOD_{heat}$ calculated according to the above formulas when changing from the standby mode (top and bottom heat settings at 25) to a cooking mode have a bottom heat setting of 90 and a top heating setting of 65. In this example, the toaster is in the standby mode from time=zero until time=60 seconds. At that point, the top heat setting is changed from 25 to 65, and the bottom heat setting is changed from 25 to 90. Starting at time=60 seconds, the calculated heat percentages, predicted cooking abilities, and heat-based speed modification $MOD_{heat}$ will change according to the formulas.

After the heat percentage HP is calculated based on the heat setting HS and the estimated temperature ET, a vertical heat shift is applied. This is intended to account for heat rising to the top of the toaster in times when no product is going through the toaster. Vertical heat shift is applied when the toaster has nearly reached full cooking ability (i.e., heat-based speed modification $MOD_{heat}$ is close to 100) and the electric eye has not detected a product for 120 seconds. Once these conditions are satisfied, the duty cycle of the top heating element drops by 2% every 80 seconds up to a maximum of 8%. If desired, the bottom heating element can also be modified duty cycle using a similar method. It should be appreciated that the above numbers are merely examples, and different numbers could be used without departing from the described concepts.

The controller is also programmed to adjust the conveyor speed to account for a product loading condition (i.e., the amount of product placed on the conveyor over a previous period of time). If a large number of products are placed on the conveyor, then the actual cooking ability of the toaster is less. In this regard, the controller monitors the data from the product sensor and calculates a product loading modification to the speed of the conveyor to account for the amount of product on the conveyor over a previous time period. In the illustrated embodiment, the product sensor is the electric eye that determines the presence or absence of a food product on the conveyor. Alternatively, the product sensor could be any suitable sensor, such as a mechanical switch. The signal from the electric eye is "0" when the eye is closed (i.e., product is present) and is "1" when the eye is open (i.e., no product is present).

To account for the readings from the electric eye, the controller calculates product loading calculation called an "eye calculation" EC. The eye calculation EC is a dimensionless number from zero to one and is calculated every second according to the following formula:

$$EC=(EC_{previous}*ETC)+(Reading*(1-ETC)$$

$EC_{previous}$=previous eye compensation
ETC=eye time constant
Reading=electric eye reading ("0" or "1")

The eye time constant is a number that predicts how much toasting ability a piece of food product will remove from the chamber, and is subject to change based on the product being cooked. In the illustrated embodiment, the eye time constant is 0.98. The lower boundary LB is the lowest level to which the speed will drop which being continuously loaded with products, and is subject to change based on the product being cooked. In the illustrated embodiment, the lower boundary is 0.65.

After the eye calculation EC is performed, the controller calculates an eye-based speed modifier $MOD_{eye}$ that will be used to modify the speed of the conveyor. The eye-based speed modifier is a dimensionless number between zero and one and is calculated according to the following formula:

$$MOD_{eye}=EC*(1-LB)+LB$$

LB=Lower Boundary of Eye

Using the above-calculated eye-based speed modification $MOD_{eye}$, the conveyor will be driven at a speed corresponding with an actual cook time $CT_{actual}$ that is calculated according to the following formula:

$$CT_{actual}=MOD_{eye}*CT_{setpoint}*MOD_{other}$$

Figure 5:
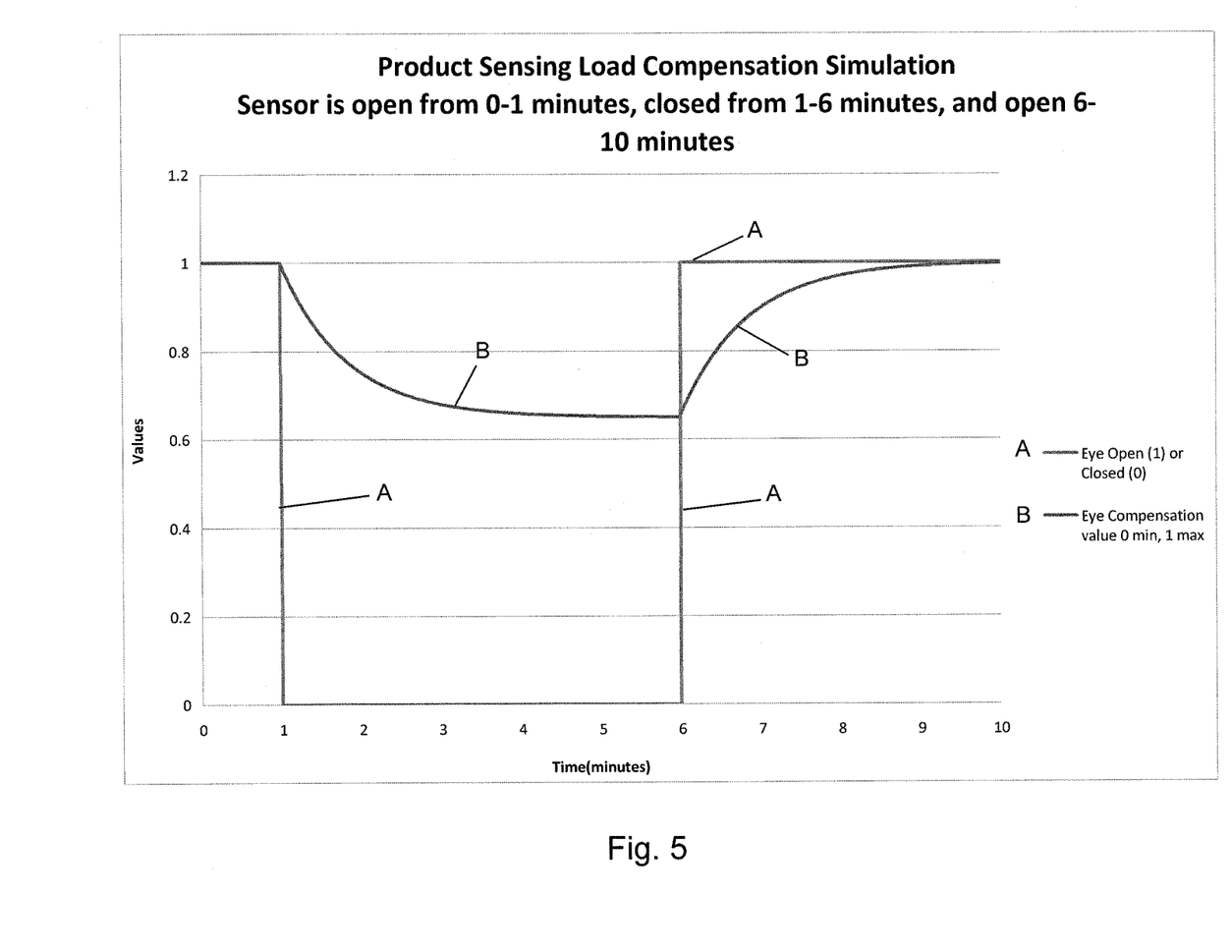
FIG. 5 is a chart showing product-based speed compensation.

The chart in FIG. 5 shows eye calculation EC and eye-based speed modification $MOD_{eye}$ calculated according to the above formulas under a changing signal from the electric eye. Specifically, at time=zero, the eye is open ("1"), indicating that no product is present on the conveyor. At time=60 seconds, the eye is closed ("0") and held closed until time=360 seconds, at which time the eye is open for the remainder of the data.

Various features and advantages of the invention are set forth in the following claims.

What is claimed is:
1. An oven comprising:
a housing defining a cook chamber;
a heating element positioned adjacent the cook chamber;
a controller programmed, upon a change in a heat power setting of the heating element, to control a cook time based upon a current predicted cooking ability of the oven, wherein the current predicted cooking ability is calculated by the controller using a formula that is a function of a heat power input during a previous time period, a predicted cooking ability from a previous time period, and a heat time constant that represents the estimated rate at which a change in the heat power input causes a change in cooking ability.

2. An oven as claimed in claim 1, wherein the predicted cooking ability from a previous time period is multiplied by the heat time constant.

3. An oven as claimed in claim 1, wherein the current predicted cooking ability comprises a current estimate temperature that is calculated according to a formula comprising:

$$ET=(ET_{previous}*HTC)+(HP_{previous}*(1-HTC),$$

wherein ET=current estimated temperature,
$ET_{previous}$=estimated temperature from a previous time period,
HTC=heat time constant, and
$HP_{previous}$=heat percentage from a previous time period.

4. An oven as claimed in claim 3, further comprising:
a conveyor positioned to move food product through the cook chamber; and
a motor coupled to the conveyor, wherein the controller is programmed to control a speed of the conveyor.

5. An oven as claimed in claim 4, wherein the controller is programmed to control the speed of the conveyor based upon speed modification that is calculated according to a formula comprising:

$$MOD_{heat}=1+((ET_{top}-HS_{top})/HS_{top})+((ET_{bot}-HS_{bot})/HS_{bot}),$$

wherein $MOD_{heat}$=speed modification,
$ET_{top}$=estimated temperature of the top element,
$HS_{top}$=heat setting of the top element,
$ET_{bot}$=estimated temperature of the bottom element, and
$HS_{bot}$=heat setting of the bottom element.

6. An oven comprising:
a housing defining a cook chamber;
a heating element positioned adjacent the cook chamber;
a presence sensor positioned to sense the presence of food in the cook chamber; and
a controller programmed to control a cook time based upon a product loading condition determined by the controller, wherein the product loading condition is calculated by the controller using a formula that is a function of an amount of a product sensed by the presence sensor to be in the cook chamber over a period of time and a time constant that predicts how much cooking ability the amount of product placed in the cook chamber will remove from the cook camber.

7. An oven as claimed in claim 6, wherein the presence of food in the oven is determined by a presence sensor.

8. An oven as claimed in claim 6, wherein the calculation is an eye calculation that is a function of a previous eye calculation.

9. An oven as claimed in claim 8, wherein the eye calculation is a function of the previous eye calculation and an eye time constant.

10. An oven as claimed in claim 9, further comprising a product sensor providing an eye reading, wherein the eye calculation is calculated according to a formula comprising:

$$EC=(EC_{previous}*ETC)+(Reading*(1-ETC))$$

wherein EC=eye calculation,
$EC_{previous}$=previous eye calculation,
Reading=eye reading, and
ETC=eye time constant.

11. An oven as claimed in claim 6, further comprising:
a conveyor positioned to move food product through the cook chamber; and
a motor coupled to the conveyor; wherein the controller is programmed to control a speed of the conveyor.

* * * * *